(12) United States Patent
Braghiroli et al.

(10) Patent No.: US 9,032,789 B2
(45) Date of Patent: May 19, 2015

(54) AUTOMOTIVE SHOP SERVICE APPARATUS HAVING A MEANS FOR DETERMINING THE ROLLING RESISTANCE COEFFICIENT OF A TYRE

(71) Applicant: Snap-on Equipment Srl a unico socio, Correggio (RE) (IT)

(72) Inventors: Francesco Braghiroli, Reggio Emilia (IT); Marco Tralli, Modena (IT)

(73) Assignee: SNAP-ON EQUIPMENT SRL A UNICO SOCIO, Correggio (IT)

( * ) Notice: Subject to any disclaimer, the term of this patent is extended or adjusted under 35 U.S.C. 154(b) by 217 days.

(21) Appl. No.: 13/866,865

(22) Filed: Apr. 19, 2013

(65) Prior Publication Data
US 2014/0311231 A1    Oct. 23, 2014

(51) Int. Cl.
  *G01M 17/02*    (2006.01)
  *G01M 1/04*    (2006.01)

(52) U.S. Cl.
  CPC ............. *G01M 17/021* (2013.01); *G01M 1/04* (2013.01)

(58) Field of Classification Search
  None
  See application file for complete search history.

(56) References Cited

U.S. PATENT DOCUMENTS

| | | | |
|---|---|---|---|
| 4,197,736 A | | 4/1980 | Barrett |
| 4,702,103 A | * | 10/1987 | Wenz .............................. 73/146 |
| 4,704,900 A | * | 11/1987 | Beebe ............................. 73/146 |
| 4,805,125 A | * | 2/1989 | Beebe ........................... 702/105 |
| 4,852,398 A | * | 8/1989 | Cargould et al. ............... 73/146 |
| 4,956,995 A | * | 9/1990 | Harrold et al. .................. 73/146 |
| 4,969,355 A | | 11/1990 | Doi et al. |
| 6,035,709 A | * | 3/2000 | Barnette, Jr. .................... 73/146 |
| 6,546,635 B1 | * | 4/2003 | Gerdes ........................ 33/203.13 |
| 6,581,448 B2 | * | 6/2003 | Kimbara et al. ................ 73/146 |
| 6,609,074 B2 | * | 8/2003 | Shteinhauz ..................... 702/75 |
| 6,644,109 B2 | * | 11/2003 | Meinen ............................ 73/146 |
| 8,028,570 B2 | * | 10/2011 | Seichter et al. ................. 73/146 |
| 8,250,915 B1 | | 8/2012 | Voeller et al. |
| 8,347,703 B2 | * | 1/2013 | Yurjevich et al. ............... 73/146 |

FOREIGN PATENT DOCUMENTS

| | | |
|---|---|---|
| EP | 2110270 A1 | 10/2009 |
| EP | 2361791 A1 | 9/2011 |
| WO | 2011/101006 A1 | 8/2011 |

OTHER PUBLICATIONS

European Search Report European Application No. EP 13 16 4584 dated Oct. 1, 2013.

* cited by examiner

*Primary Examiner* — Peter Macchiarolo
*Assistant Examiner* — Jermaine Jenkins
(74) *Attorney, Agent, or Firm* — McDermott Will & Emery LLP (57) ABSTRACT

A vehicle wheel service apparatus, in particular a wheel balancer or a tire changer, comprising a load means for applying a predetermined load onto a peripheral surface of a wheel/tire assembly, a sensor device arranged to determine forces acting between the peripheral surface of the wheel/tire assembly and the load means, wherein the forces comprise at least a first force acting in a radial direction of the wheel/tire assembly and a second force acting in a circumferential direction of the wheel/tire assembly, and an evaluation device arranged to determine a rolling resistance coefficient of the tire on the basis of the first and second forces.

15 Claims, 8 Drawing Sheets

AUTOMOTIVE SHOP SERVICE APPARATUS HAVING A MEANS FOR DETERMINING THE ROLLING RESISTANCE COEFFICIENT OF A TYRE

The invention relates to the field of automotive shop service machines such as wheel balancers, tyre changers, roller test benches and so on, and in particular to an automotive shop service machine having means for determining the rolling resistance coefficient of a tyre or wheel (tyre/rim assembly) of a motor vehicle.

A tyre changer and a method for fitting a tyre onto a rim of a vehicle wheel and/or for removing a tyre from a rim of a vehicle wheel is already known from EP 2 110 270 A1. Such a tyre changer comprises at least one fitting and/or removal tool being movably attached to a pillar. The at least one fitting and/or removal tool can be aligned in such a way that a tyre can be fitted onto a tyre or removed from a tyre without damaging the rim.

It is further known from WO 2011/101006 A1 to provide a tyre changer having a load roller for measuring radial and/or lateral forces acting between a tyre and the load roller applying a controlled force onto the rotating tyre. The radial and/or axial force variations can be detected and thereby tyre non-uniformity can be determined.

In order to improve fuel efficiency of motor vehicle tyres, recently it is stipulated to label new tyres with a fuel efficiency classification system. The fuel efficiency classification of a tyre is determined by means of bulky and expensive test equipment at specific test laboratories. Such test equipment is not available for used tyres during service in automotive shops and garages.

The object of the invention is to provide a vehicle wheel service apparatus such as a tyre changer, a wheel balancer or a roller test bench, being able to determine a rolling resistance coefficient of a tyre.

The problem is solved by a vehicle wheel service apparatus, in particular a wheel balancer or a tyre changer, comprising a mounting device arranged to rotatably receive a wheel/tyre assembly comprising a tyre and a wheel rim, a load means for applying a predetermined load onto a peripheral surface of the wheel/tyre assembly, first driving means arranged to move the mounting device and the load means relative to each other so that the peripheral surface of the wheel/tyre assembly comes into contact with the load means, a control device arranged to control the movement of the mounting device and the load means relative to each other and arranged to control the predetermined load applied by the load means, second driving means arranged to drive the mounting device and/or the load means for rotating the wheel/tyre assembly at least while it is in contact with the load means, a sensor device arranged to determine forces acting between the peripheral surface of the wheel/tyre assembly and the load means, wherein the forces comprise a first force acting in a radial direction of the wheel/tyre assembly and a second force acting in a circumferential direction of the wheel/tyre assembly, and an evaluation device arranged to determine a rolling resistance coefficient of the tyre on the basis of the first and second forces determined by the sensor device. The sensor device may be coupled to force sensors, preferably load cells, and receive electric signals provided by the force sensors, wherein the electric signals correspond to the detected force. However other force sensors known to the skilled person may be used, too.

In a further development of the invention, the apparatus may further comprise at least one first force sensor, preferably a load cell, arranged to detect the first force (acting in radial direction of the wheel/tyre assembly) at a support element of the mounting device or at a support element of the load means. The support element of the mounting device may be a frame or supporting the rotary shaft of the mounting device, for example. The first force sensor may be arranged between the rotary shaft and the support frame so as to detect forces acting perpendicular to the shaft and parallel to a radial direction of the wheel/tyre assembly. Preferably, there are provided two first force sensors in a configuration usually used in a wheel balancer, so that the actual first force acting on the tyre may be derived from the forces measured by the two first force sensors. The support element of the load means may be a frame supporting the load means. The first force sensors may be located at any supporting element in any suitable position which enables the sensors to detect a force resulting from the first force acting at the tyre contact patch in a radial direction of the tyre, so that the first force can be derived.

In a preferred embodiment of the invention, the load means comprises a load belt apparatus having at least two belt rollers around which a load belt is tensioned, and a driving means as the second driving means for causing the load belt to circulate around the belt rollers. The load belt apparatus is advantageous in that it provides for a flat contact area between the tyre and the load belt so that a good approximation to the real operation conditions of a tyre running on a road surface may be achieved.

In another preferred embodiment of the invention, the load means comprises a load roller. The load roller is a simple and cost efficient device for applying a predetermined load onto the wheel/tyre assembly. However, in vehicle wheel service machines used in automotive shops, the diameter of a load roller is limited to relative small values, considerably smaller than the large load drums used in specific laboratories for determining the official fuel efficiency classification of a tyre. In order to relate the determined rolling resistance coefficient to the official fuel efficiency classification of tyres, it is necessary to compensate the smaller roller diameter resulting in a slightly different force acting direction changed by $\alpha$ substantially equal to $\epsilon_2/R$ by using a correction factor, such as $C_1=(1+r_L/R)$, wherein $r_L$ being the rolling radius of the tyre (i.e. the distance between the rotary axis of the wheel and the surface of the load roller), R being the radius of the load roller, and $\epsilon_2$ being the distance between the effective average point A of application of the normal force N and the plane including both the rotary axis of the load roller and the rotary axis of the mounting device.

In a further development of the invention the apparatus further comprises at least one second force sensor, preferably a load cell, arranged to detect the second force at a support element of the mounting device or at a support element of the load means. Analogue to the first force sensors, the second force sensors may be located at any supporting element in any suitable position which enables the sensors to detect a force resulting from the second force acting at the tyre contact patch in a radial direction of the tyre, so that the second force can be derived. Preferably, the second force sensors may be located at the rotary shaft of the mounting device or the rotary shaft of the load roller, for example. If a load belt apparatus is used, the second force sensors may be located at a frame supporting the load belt apparatus.

In another embodiment of the invention, the apparatus further comprises a torque detecting means detecting a driving torque of the second driving means. The torque detecting means may comprise a torque sensor (torque meter) mechanically coupled to the driving of the mounting device or the load roller. If the second driving means comprises an electric motor, the driving torque may be alternatively detected on the basis of a measured electric input current of the motor. The sensor device is further arranged to determine the second force on the basis of the detected driving torque, i.e. the second force is equal to the driving torque divided by the respective effective radius (e.g. radius of the load roller or rolling radius of the wheel). In this manner, the second force acting in circumferential direction of the tyre may be determined in a cost efficient way, and it is not required to provide additional force sensors (second force sensors) in the vehicle wheel service apparatus. Thus, costs can be reduced.

In another embodiment of the invention, the apparatus further comprises a power detecting means detecting a driving power of the second driving means. The power detecting means may comprise a power sensor (power meter) detecting the output power of the second driving means coupled to the mounting device or the load roller. If the second driving means comprises an electric motor, the driving power may be determined on the basis of the detected electric input power of the electric driving motor. The sensor device is further arranged to determine the second force on the basis of the detected driving power, i.e. the second force is equal to the driving power divided by the circular frequency ($2\pi f$, wherein f=speed of rotation) and further divided by the respective effective radius (e.g. radius of the load roller or rolling radius of the wheel). In this manner, the second force acting in circumferential direction of the tyre may be determined in a cost efficient way, and it is not required to provide additional force sensors (second force sensors) in the vehicle wheel service apparatus. Thus, costs can be reduced.

In another embodiment of the invention, the apparatus further comprises a rotary deceleration detecting means detecting a rotary deceleration of the idling rotary system including the tyre/wheel assembly and the load means applying the predetermined load onto the tyre/wheel assembly. The sensor device is further arranged to determine the second force on the basis of the detected rotary deceleration and a moment of inertia of the idling rotary system. The moment of inertia of the idling rotary system comprises the known moment of inertia of the load means and the moment of inertia of the tyre/wheel assembly with the mounting device to be determined. The moment of inertia of the tyre/wheel assembly with the mounting device may be determined on the basis of input data comprising specific tyre and rim data (including a moment of inertia), for example, or may be measured by the apparatus in an unloaded acceleration run (i.e. without any contact between the load means and the tyre) by measuring the acceleration time up to a certain rotary speed with a known driving power, or by measuring an achieved rotary speed by applying a certain driving power for a certain time period. Then, the wheel and the load means applying the predetermine load onto the tyre/wheel assembly are accelerated to a predetermined rotary speed (for example a circumferential speed of about 80 km/h or more) by the second driving means, and then the driving means is decoupled from the rotating system and rotary deceleration of the rotating system is measured. Then, a deceleration moment can be determined on the basis of the determined moment of inertia of the rotary system and the determined rotary deceleration of the tyre/wheel assembly. From this deceleration moment of the tyre/wheel assembly a circumferential deceleration force (equal to the second force) can be calculated by dividing the deceleration moment of the tyre/wheel assembly by the effective rolling radius $r_L$ of the tyre/wheel assembly. Alternatively, it is also possible to calculate the second force via the rotary deceleration of the load roller, a deceleration moment of the load roller and the radius R of the load roller. In a further step, the parasitic effects, such as friction forces generated in the bearings of the load means and the mounting device or the aerodynamic drag caused by the load means or by the tyre/wheel assembly may be transformed into a respective circumferential decelerating force (thereby considering the strength of the first force and the rotary speed for a further correction, for example) and subtracted from the determined second force in order to achieve a more reliable and accurate result. In this manner, the second force acting in circumferential direction of the tyre may be determined in a cost efficient way, and it is not required to provide additional force sensors (second force sensors) in the vehicle wheel service apparatus. Thus, costs can be reduced.

In all previously described embodiments, a corresponding correction factor may be used to correct the determined second force and to compensate the friction losses occurring in the bearings of the load means and the mounting device.

In a further development of the invention, the control device is further arranged to perform a calibrating procedure directly prior to a measuring run. In this manner, the correction factor for correcting the determined second force may be determined for every measuring run so as to improve measuring accuracy.

The calibrating procedure may comprise deactivating the second driving means, applying the predetermined load onto the peripheral surface of the wheel/tyre assembly by the load means and setting a force measured by the second force sensor as a reference value. The measuring run may comprise activating the second driving means to rotate the wheel/tyre assembly with a constant speed, and determining the second force by subtracting the reference value determined during the calibrating procedure from a current force measured by the second force sensor. In this manner, any position errors of the wheel or the load means which cause the predetermined load applied to the wheel/tyre assembly to result in a force component of acting perpendicular to the load force, i.e. in circumferential direction of the wheel/tyre assembly, may be detected while the wheel/tyre assembly is not rotating and does not produce a circumferential force resulting from rotation and rolling resistance, respectively. The circumferential force (second force) measured in the calibration procedure may then be subtracted from the circumferential force measured during the measuring run with rotating wheel/tyre assembly, so that the resulting second force only represents the circumferential force resulting from rotation and rolling resistance, respectively.

According to another embodiment, the calibrating procedure may comprise a calibrating run under measuring speed using a very small load (first force) applied to the peripheral surface of the tyre/wheel assembly and determining a second force as a reference force generated by parasitic effects (such as friction in the bearings of the mounting device or the load means, or the resistance caused by aerodynamic drag of both the tyre/Wheel assembly and the load means) with a rolling resistance being substantially equal to zero because of a tyre deformation of substantially zero. Then, this determined reference force may be used to correct the determined second force during the proper measuring run with the predetermined load applied to the tyre/wheel assembly. In this correction, additionally a further correction factor may be used to compensate for increasing parasitic effects resulting from increasing tyre load (increasing first force). In this manner, any parasitic effects may be eliminated from determination of the second force so that a more reliable and accurate rolling resistance coefficient can be determined.

In a further development of the invention the rolling resistance coefficient may be determined for different rotary speeds of the wheel/tyre assembly. In this manner, a more accurate rolling resistance coefficient may be determined, for example by calculating a mean value of the measured rolling resistance coefficients.

In another embodiment of the invention the evaluation device is further arranged to receive specific tyre data of the tyre, wherein the specific tyre data comprises at least one of an official fuel efficiency classification provided by the tyre manufacturer of the tyre, and an elapsed operation time of the tyre; and wherein the evaluation device is further arranged to provide at least one of the following evaluation results, based on the specific tyre data and the determined rolling resistance coefficient of the tyre: a current fuel efficiency classification of the tyre, a comparison of the current fuel efficiency classification with the official fuel efficiency classification of the tyre, and an estimation of a remaining operation time of the tyre up to the degradation to a lower fuel efficiency classification. The specific tyre data may be manually input to the evaluation device, or may be automatically provided by the on-board computer of the vehicle or by a tyre data base of the automotive shop via a wired or wireless connection. Alternatively, the specific tyre data may be stored on an RFID device attached to the vehicle or the tyre, for example, and received by an RFID reader connected to or incorporated in the vehicle wheel service apparatus.

In a further development of the embodiment the evaluation device is further arranged to receive specific vehicle data of the vehicle on which the tyre is mounted, wherein the specific vehicle data comprises at least one of a vehicle type, a vehicle model, a vehicle weight, and a specific fuel consumption of the vehicle; and wherein the evaluation device is further arranged to provide at least one of the following evaluation results, based on the specific vehicle data, the specific tyre data and the determined rolling resistance coefficient of the tyre: an estimation of a future specific fuel consumption of the combination of the vehicle and the tyre, and a difference in specific fuel consumption of the combination of the vehicle and the tyre between the current fuel efficiency classification and the official fuel efficiency classification of the tyre. The specific vehicle data may be manually input to the evaluating means, or may be automatically provided by the on-board computer of the vehicle or by a customer data base of the automotive shop via a wired or wireless connection. Alternatively, also the specific vehicle data may be stored on an RFID device attached to the vehicle, for example.

In a further development of the invention the apparatus further comprises printing means for printing at least one of the determined rolling resistance coefficient and the evaluation results of the tyre. Printouts are useful for a customer of the automotive shop and may be used for documentation and proving purposes.

In a further development of the invention the apparatus further comprises temperature detecting means, preferably an infrared thermometer, arranged to detect the temperature of the tyre, wherein the determined rolling resistance coefficient is corrected on the basis of the detected tyre temperature. Thus, an accurate rolling resistance coefficient and the correct fuel efficiency classification can be determined even if the tyre temperature significantly deviates from standard conditions.

The present invention may also be applied to a roller test bench used in automotive shops. The roller test bench may be a modified roller brake test stand, and may comprise a first force sensor detecting a vertical force (load of the tyre to be tested) and a second force sensor detecting a horizontal force in longitudinal direction (driving direction) of the tyre. In this case, the vehicle has to be positioned on the roller test bench such that the tyre to be tested is placed on the at least one roller rotatably supporting the tyre. Thereafter, the vehicle has to be held fixed in position while a reference value detected by the second force sensor is determined. Then, the wheel with the tyre is rotated, preferably by the vehicle engine, with a constant speed and the circumferential force (second force) is determined as a force detected by the second force sensor minus the previously detected reference value. In this manner, a calibration procedure is performed similar to that mentioned above, so that a positioning error of the vehicle or tyre on the roller test bench may be compensated and the rolling resistance coefficient of the tyre may be determined with sufficient accuracy. On the other hand, the friction forces produced by the wheel suspension (wheel bearings) and the brake system (disc brake, for example) do not substantially affect the measurement because they are compensated by an additional driving force of the vehicle engine. Friction forces generated by the roller bearings may be compensated by using a correction factor. If the roller test bench uses two parallel rollers to support each wheel, the different tyre deformation in comparison to a single roller may be compensated by a correction factor which can be determined in dependence on the roller geometry. Alternatively, using two rollers for each wheel enables omitting a separate device for holding the vehicle fixed in position which may be necessary in case of only one roller for each wheel. In a further embodiment of such a roller test bench, the wheel may be rotated by the at least one driven roller supporting the wheel. In this case, the brake shoes should be put back from the brake disc in order not to affect the measurement, while the friction of the wheel bearings may be compensated by a correction factor.

In all embodiments of the invention described above, the determined measurement values or the amounts derived (in particular the second force or the rolling resistance coefficient) may be further corrected by further correction factors which may be determined in dependence on a plurality of predetermined or measured values. Such values may be, for example, the vehicle type, the wheel load force (i.e. the first force), the actual ambient temperature, the actual rolling radius $r_L$ of the tyre (the distance between the rotary axis of the tyre/wheel assembly and the contact surface of the load means), and the actual tyre inflation pressure. The tyre inflation pressure may be measured before and/or after the measuring run in order to take into account the inflation pressure and/or warm-up temperature effects. The tyre inflation pressure is an important value since amount of tyre deformation strongly depends on inflation pressure so that rolling resistance is influenced by the tyre inflation pressure. The official fuel efficiency classification is based on a typical standard tyre inflation pressure so that inflation pressure has to be set correctly during measurement for achieving comparable results, or the measuring results have to be corrected in accordance to the actual tyre inflation pressure. Also the tyre temperature may be measured before and/or after the measuring run in order to consider tyre temperature and/or warm-up effects, analogue to the above considerations with respect to the tyre inflation pressure. On the other hand, it is also possible to perform a warm-up run until the tyre reaches a predetermined or stable temperature. Alternatively or additionally, warming up the tyre may be assisted by a heat source heating the tyre (e.g. an infrared radiation source or a warm air fan) to shorten the warm-up period which may otherwise require up to about 30 minutes (or more in case of large tyres such as truck tyres). Another value used for correction may be the load roller diameter, because a smaller roller diameter results in a different (larger) tyre deformation, and thus, to a larger rolling resistance. In order to relate the determined rolling resistance coefficient to that determined with a larger diameter test drum (such as typically used in official test laboratories for official classification tests), or to that determined for a flat load surface (like a road or a load belt apparatus), or vice versa, a predetermined correction factor may be used to provide comparable results. A further value used for determined a correction factor may be the rotary speed during measurement (the rolling resistance is neither constant nor proportional to the rotary speed, but follows a certain function of the rotary speed; however, it may be assumed to be substantially constant for circumferential speeds of the tyre less than 50 km/h, for example), Another value or condition used for correction may be the texture of the contact surface of the load roller or load belt. SAE standards prescribe a 80 Grit surface, while ISO standards prescribe a smooth or 80 Grit surface. For every load surface texture used a corresponding correction factor may be determined.

Also other correction factor based on further measured or predetermined values may be used additionally or alternatively to that mentioned above in order to improve reliability and accuracy of the measurements and the determined rolling resistance coefficient. For example, the rotary friction forces generated by the bearings of the load roller or the mounting device may be used for correction and may be determined, for example, in accordance to the radial load (first force) applied by the load means onto the wheel/tyre assembly and/or the respective rotary speed. To this, measured values (such as the first force, ambient temperature, the rotary speed etc) may be put into a stored correction factor function provided by the manufacturer of the vehicle wheel service machine and stored therein. Some correction factors may depend on vehicle or tyre specifications.

In a further development of the invention, the apparatus may further comprise means for detecting a third force acting between the peripheral surface of the wheel/tyre assembly and the load means in an axial direction of the wheel/tyre assembly (such as force sensors coupled to the axis or to a support element of the load means or the mounting device, for example). This axial (or lateral) force may be detected at the support of the axis of the mounting device, for example, and may indicate a conicity of the tyre or other problems. Such information can be considered by the determination of the rolling resistance coefficient, for example in the form of a further correction factor, or may be displayed to the operator as additional information about the tyre condition.

The invention is described in further detail hereinafter with reference to the drawing figures in which.

It has to be noted that the drawing figures are not true to scale, but are merely used to depict the principles of the invention. In other words, the distances, sizes and the ratios of the components depicted in the drawings may vary within the spirit of the invention. Furthermore, in the following description of preferred embodiments of the invention, the terms left, right, top, bottom and the like relating to the drawing figures are to be interpreted in an orientation in which the reference signs in the drawing can be read. These terms shall not be related to any position or orientation with respect to the whole apparatus in a limiting manner, but merely serve to facilitate understanding of the invention.

First, with respect to FIG. 10 the physical principles of a tyre rolling on a flat surface, like o road surface, will be explained. When a common vehicle tyre is rolling on a flat hard surface, such as a road, due to the deformation of the tyre at the contact patch (tyre/road interface, see deformation δ in FIG. 9), the tire deformation consumes energy, so that during compression and elastic recovery of the tyre an unequal force is needed. In other words, the normal pressure distribution over the tyre contact patch is not uniform. The distribution of the normal force Fz(x) (=N(x)) is higher in the leading half of the contact patch than in the trailing half. Hence, a resulting average normal force Fz does not act along a line extending through the rotary axis of the tyre, but is shifted by a distance "a" to a point A in the leading half of the contact patch. Therefore, the normal force produces a moment $M_W=a \cdot Fz$ about the rotary axis of the tyre which counteracts the rolling movement V. In order to compensate that moment $M_W$, a driving force Fx is needed to act on the rotary axis of the wheel or tyre in driving direction. For a steady driving state with constant speed, the equation $Fx=M_W/r_L$ must be satisfied, wherein $r_L$ is the rolling radius of the tyre, i.e. the distance between the rotary axis of the tyre and the road surface. In other words, $a \cdot Fz=r_L \cdot Fx$ has to be satisfied.

Figure 8:
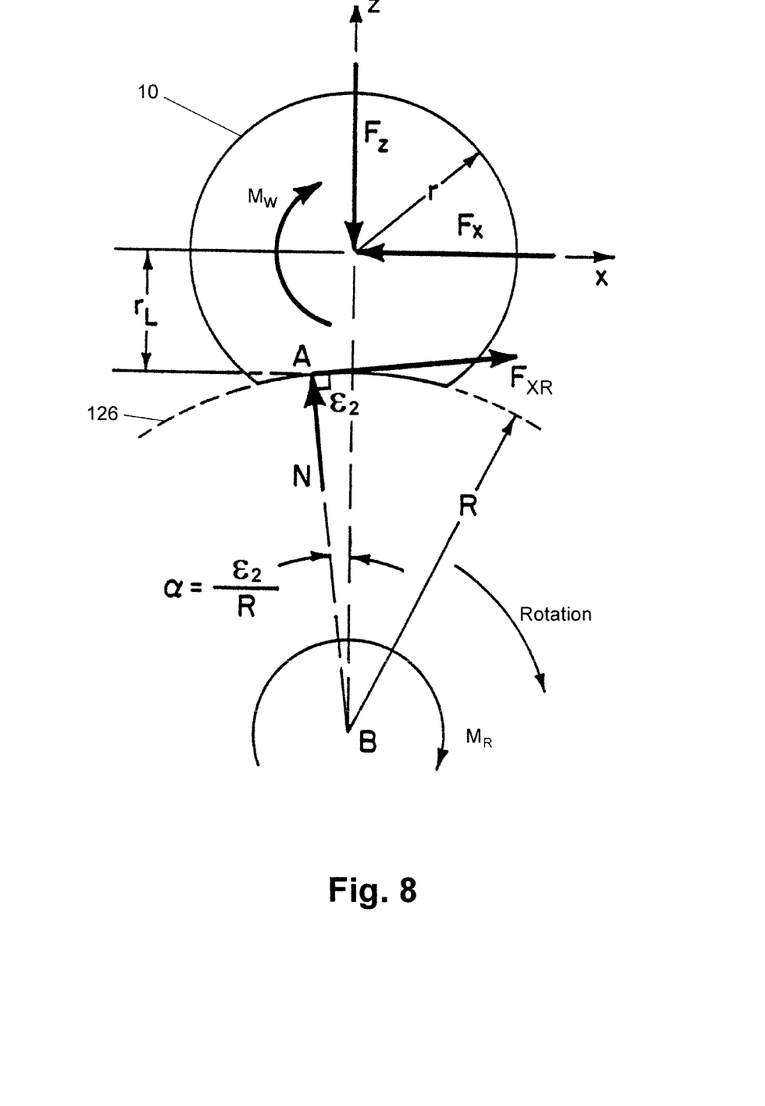
FIG. 8 shows a schematic diagram of a tyre rolling on a load roller.
Figure 9:
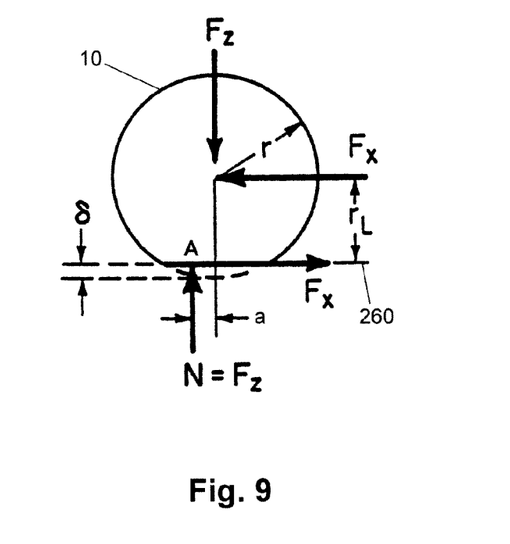
FIG. 9 shows a schematic diagram of a tyre rolling on a load belt apparatus.
Figure 10:
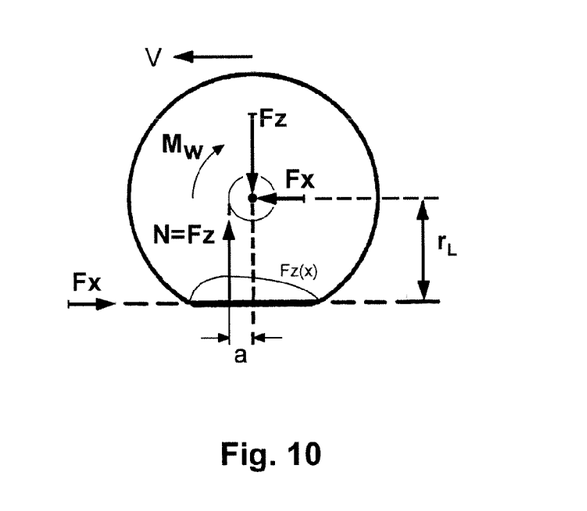
FIG. 10 shows a schematic diagram depicting the physical principles of a tyre rolling on a flat surface.

As shown in FIG. 8, in case of a tyre rolling on a cylindrical surface of a load roller 126, the distance $\epsilon_2$ corresponds to distance "a" of FIGS. 9 and 10 showing a plane surface on which the tyre 10 is rolling. Here, the force $F_{XR}$ corresponds force Fx of FIGS. 9 and 10 and is deflected by an angle α. This leads to slightly deviating measurements of the circumferential force $F_{XR}$ with respect to the real force Fx required for determination of the rolling resistance coefficient of the tyre 10. This deviation may be compensated by multiplying the force $F_{XR}$ with the correction factor $f_c=(1+r_L/R)$, as mentioned above.

With respect to FIGS. 1 to 9, show preferred embodiments of the invention will be described in the following.

Figure 1:
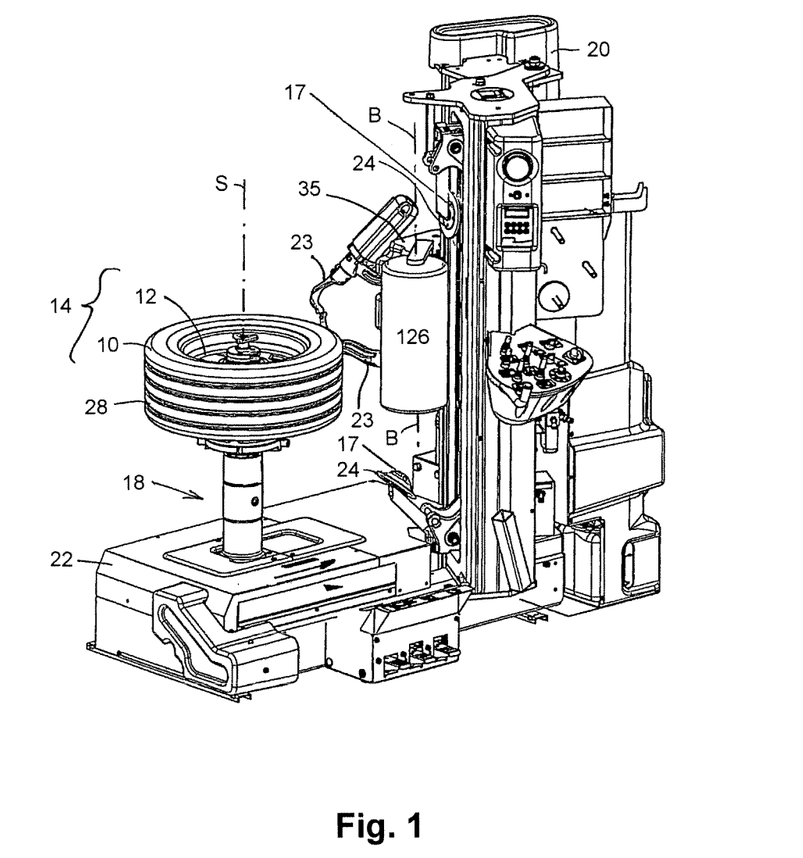
FIG. 1 shows a tyre changer of the invention with a wheel/tyre assembly and a load roller in a position in which the peripheral surface of the wheel/tyre assembly does not engage the load roller.
Figure 2:
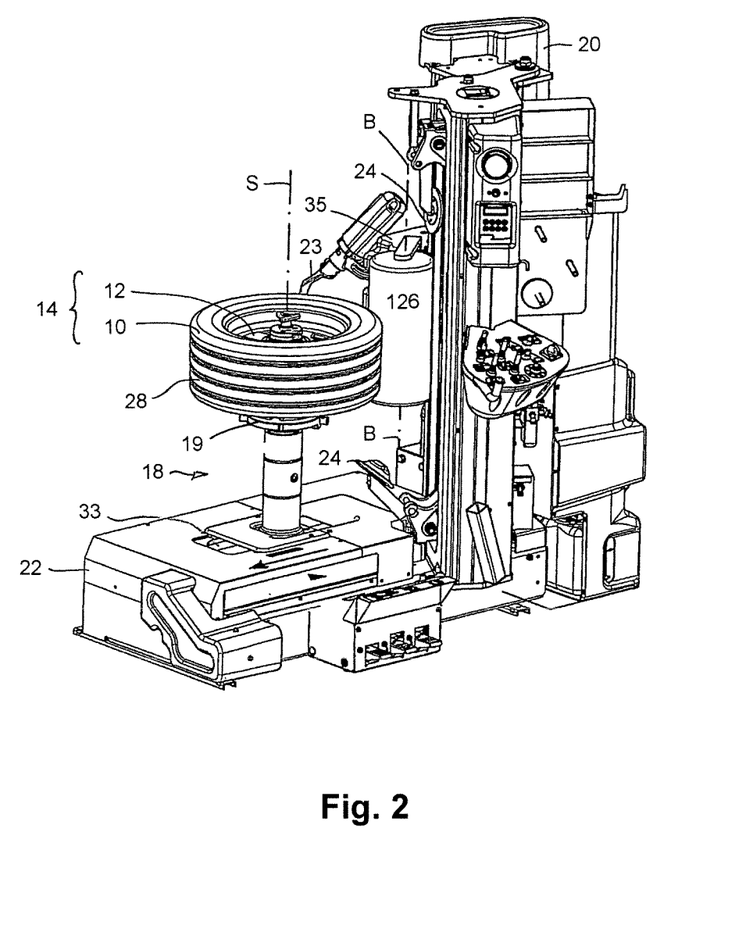
FIG. 2 shows the tyre changer of FIG. 1 with the peripheral surface of the wheel/tyre assembly engaging the load roller.
Figure 3:
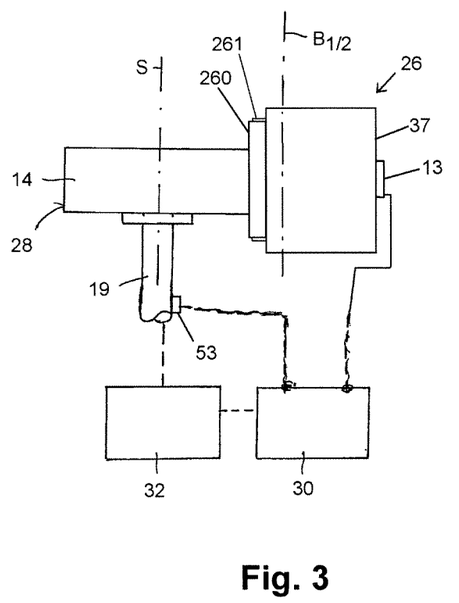
FIG. 3 shows a control device, a sensor device and a load belt apparatus used in a vehicle wheel service apparatus according to the invention, which may be used instead of the load roller shown in FIGS. 1 and 2.

In FIGS. 1 and 2 a tyre changer is shown, that means an apparatus for fitting a tyre 10 onto a wheel rim 12 of a vehicle wheel which constitutes an embodiment of a wheel/tyre assembly 14 or for removing a tyre 10 from a wheel rim 12 of the wheel/tyre assembly. FIGS. 1 and 2 show a tyre changer having a load roller 126 for loading a wheel/tyre assembly and measuring radial and circumferential forces acting between the tyre and the load roller 126.

Figure 4:
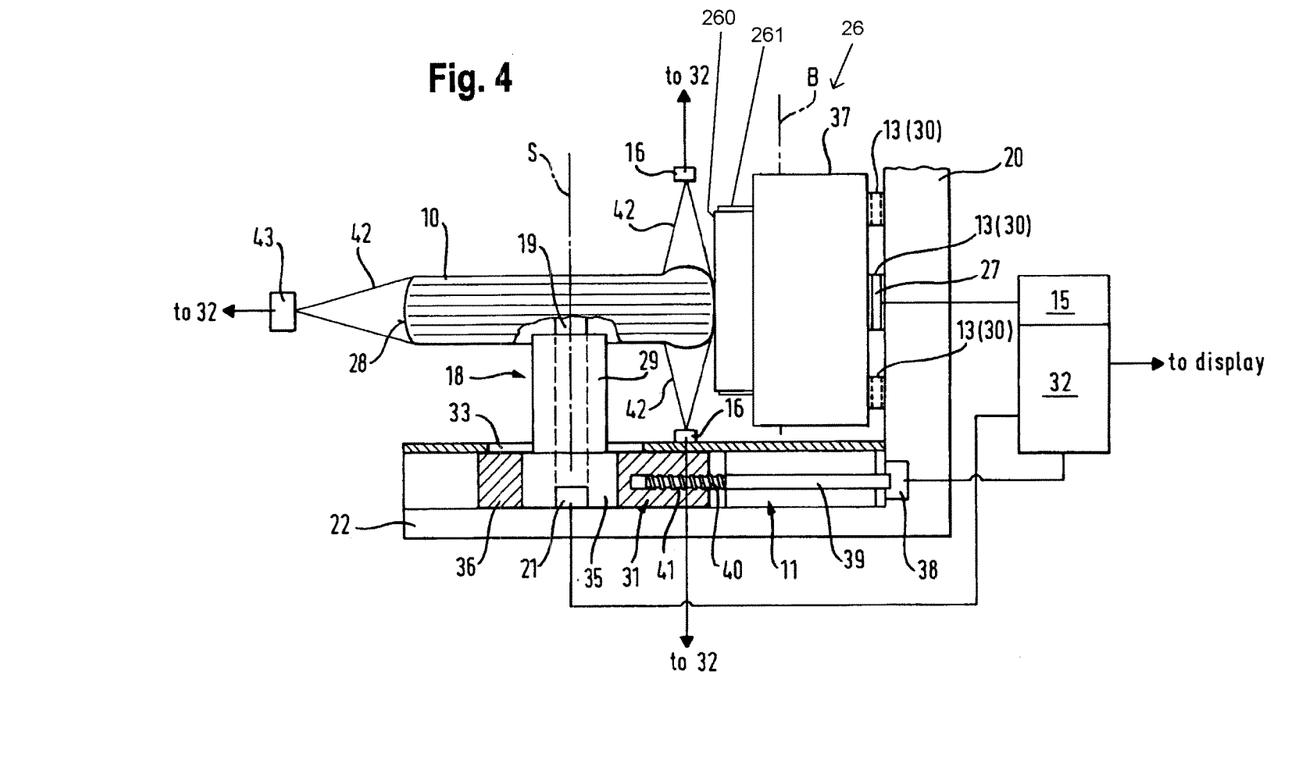
FIG. 4 shows the positions of the wheel/tyre assembly and of the load belt apparatus in their engaging position.

FIG. 4 shows another embodiment of a vehicle wheel service apparatus, such as a tyre changer or a wheel balancer according to the present invention, wherein the load roller 126 of FIGS. 1 and 2 is replaced with a load belt apparatus 26.

Figure 5:
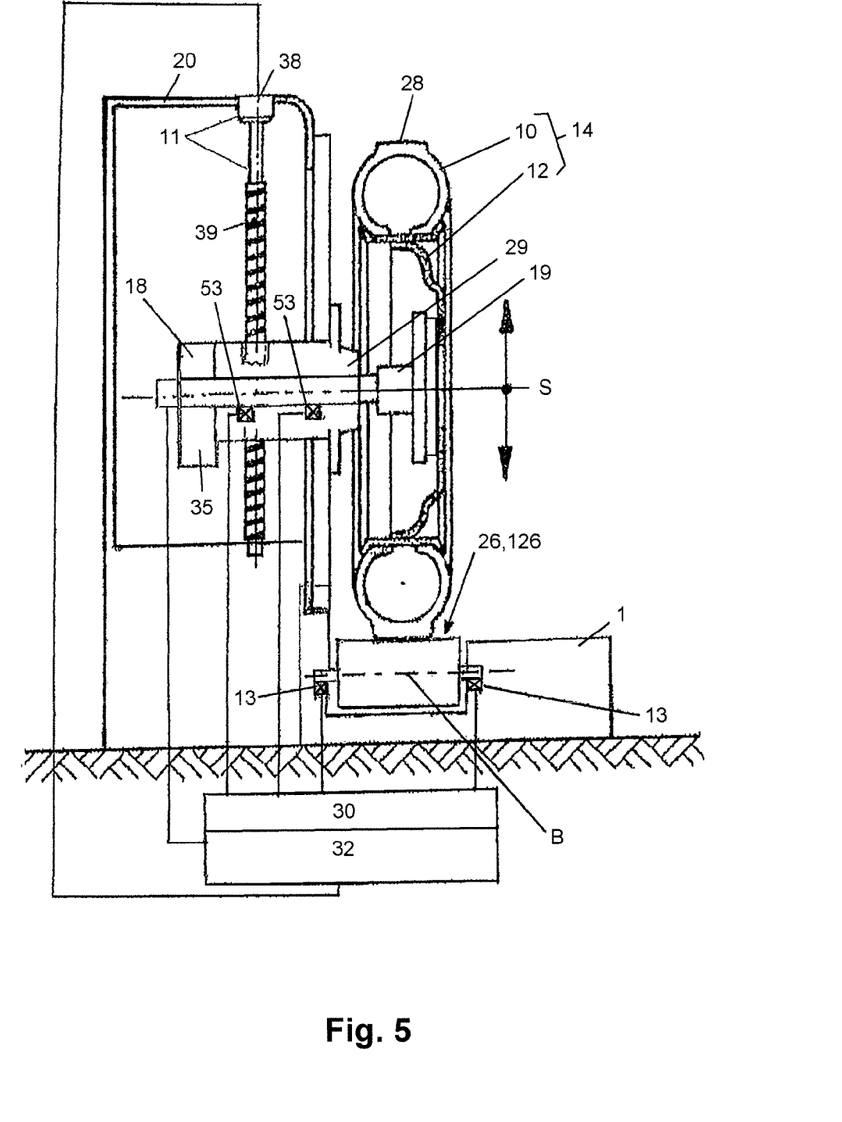
FIG. 5 shows a wheel balancer according to an embodiment of the invention.

In FIGS. 1, 2 and 4, the load means is arranged at a vertical column 20 of the vehicle wheel service apparatus, while the mounting device 18 is arranged such that the wheel is held in a horizontal position. FIG. 5 shows a wheel balancer according to the invention, wherein a load means 26, 126 is arranged at a base frame of the wheel balancer while the mounting device 18 is arranged such that the wheel is held in a vertical position. The exact position of the wheel is not important as long as the load means is arranged accordingly so that it is able to apply a load in a direction radial to the wheel/tyre assembly 14.

As shown in FIGS. 1 and 2, the tyre change of the invention comprises a wheel mounting device 18 which has a shaft 19 to which the wheel rim 12 is fixed. The wheel mounting device 18 has an axis 8 and is rotatable about the axis 8. The wheel mounting device 18 may be driven by a second drive means 35 which can be in the form of an electric motor. The wheel rim 12 is non-rotatable connected to the shaft 19 of the mounting device 18 in particular with clamping means and is fixed in such a way that it is centered to the shaft 19. The mounting device 18 is movable towards a support 20 which may carry mounting/demounting tools and the load means in the form of the load roller 126 or the load belt apparatus 26 according to the invention (see arrow in FIGS. 1 and 2). The support 20 is designed as a vertical pillar of the tyre changer.

Thereby, the mounting device 18 can be fixed in several positions being differently spaced from the support 20. The support 20 extends substantially parallel to the axis S of the mounting device 18. The mounting device 18 is supported and guided on a support 22 or base frame for a linear movement, particularly in horizontal direction. The supports 20 and 22 are rigidly connected together. The mounting device 18 can be stationary locked in its position by locking means 31 (FIG. 4) during the measurement. The mounting device 18 includes the rotary drive 35 (second driving means), the shaft 19 and a shaft support 29 which is rigidly connected to a sliding carriage 36 which is guided for a linear movement in the support 22.

At least one fitting and/or removal tool is height-adjustable attached to the support 20. FIGS. 1 and 2 show various types of fitting or removal tools, namely a hook-shaped tool 23 and two bead releasing tools 24. The bead releasing tools 24 can be moved towards each other in parallel relationship with the axis S of the mounting device 18 and—as the wheel is centered positioned to the shaft 19—of the wheel when pressing tyre beads off the rim flanges. The mounting and demounting operations are performed while the wheel/tyre assembly is released from the load belt apparatus 26 (according to FIG. 1).

Furthermore, as shown in FIG. 4, the load belt apparatus 26 is preferably attached to the support 20 in a fixed position. In this case, according to a further development of the invention, the mounting device 18 may be designed to axially move in order to align the wheel center plane with the load belt apparatus 26 so that the tyre is running in the middle of the load belt.

In another embodiment, the load belt apparatus 26 can be movable in axial direction (i.e. parallel to the rotary axis of the wheel) in order to get aligned with the wheel center plane. In this manner, the load belt apparatus 26 can be centrally positioned to an opposite wheel/tyre assembly 14 and may be adaptable to different widths or rim offsets of wheel/tyre assemblies.

In FIG. 1, the mounting device 18 is shown in the position, in which a peripheral surface of the wheel/tyre assembly, in particular the tread surface 28, does not engage the roller 126. FIG. 2 shows the position, in which the tread surface 28 engages the roller 126. The same positions shown in FIGS. 1 and 2 apply to the tyre changer having the load belt apparatus 26 according to the invention instead of the load roller 126. The mounting device 18 can be pushed with a predefined force towards the load belt apparatus 26 or load roller 126 during a linear movement. A control device 32 is connected to the mounting device 18 and controls the applied predetermined force (see FIGS. 3 and 4). The predetermined force is transmitted directly to the peripheral surface without any momentum. Furthermore, the control device 32 is connected to a sensor device 30. The sensor device 30 is able to measure forces acting between the tread surface 28 and the load belt apparatus 26 or load roller 126. In particular, the sensor device 30 is able to determine a first (radial) force Fz and a second (circumferential) force with respect to the wheel/tyre assembly, which forces acting on the tyre contact patch (see FIG. 9 for example). Corresponding signals are sent to the control device 32. Depending on determined circumferential and radial forces Fx, Fz, a rolling resistance coefficient RRC of the tyre 10 may be determined by an evaluation device which may be integrated into the control device 32, for example. The rolling resistance coefficient RRC is the ratio of the second (circumferential) force Fx to the first (radial) force Fz, i.e. RRC=Fx/Fz and is a dimensionless quantity. However, RRC is often expressed with the pseudo dimension kg/ton.

The operation of the tyre changer is as follows. The wheel/tyre assembly 14 is centrally mounted on and fixed to the mounting device 18. Afterwards, the mounting device 18 is driven towards the support 20 as far as the tread surface 28 engages the load belt apparatus 26. By means of the locking means, the mounting device 18 is stationary locked in its position during the measurement of the force variations. A predetermined force is acting between the load belt apparatus 26 and the tread surface 28. The control device 32 controls the predetermined force. Then, the wheel/tyre assembly 14 is rotated by the mounting device 18 and the circumferential surface is "scrolled" by the load belt apparatus 26. Thereby, forces acting between the tread surface 28 and the load belt apparatus 26 are measured. In particular, the sensor device 30 measures the radial (first) and circumferential (second) forces and sends corresponding signals to the control device 32. Depending on the circumferential and radial forces (first force Fz and second force Fx), a rolling resistance coefficient RRC of the tyre 10 can be determined by evaluation components of the control device 32.

For example a strain gauge can be part of the sensor device 30. The strain gauge is in force locking connection the load belt apparatus 26 or the shaft 19 of the mounting device 18 (see FIG. 3). Expansions and/or compressions of a force feeling element 27 of the sensor device 30 caused by the forces in the radial and/or circumferential direction influence the resistance of the strain gauge which can be detected as an electric signal and measured. Piezoelectric devices or Hall sensors or other force measuring devices can be used to measure the forces and force variations.

In a preferred embodiment of the invention, the load belt apparatus 26 or load roller 126 is mounted directly to the support 20. In another embodiment, the load belt apparatus 26 or load roller 126 may be mounted to a tool carrier 35. Alternatively, the mounting device 18 can be fixedly attached and unmovable to the support frame 22 and the load belt apparatus 26 or load roller 126 can be moved by a linear drive in such a way that it is able to engage the tread surface of the tyre to apply a predetermined force to the tread surface of the wheel/tyre assembly. In its position, in which the load belt apparatus 26 or load roller 126 engages the tread surface, the load belt apparatus 26 or load roller 126 can be stationary locked during the measurement of the force variations by locking means, as will be explained in detail below.

Locking means may be provided between the load means 26, 126 or the tool carrier 35 and the support 20. The mounting device 18 can be locked by known locking means which are used for locking the mounting means 18 on the support 22 during the tire mounting/demounting operation. Alternatively, locking means which are supported on the support 22 and support 20 can act between the mounting device 18 and the load means 26, 126, as will be explained in connection with FIG. 4.

FIG. 4 shows details of the force measuring equipment according to the invention which can be arranged on a tyre changer, for instance on a tyre changer according to the FIGS. 1 and 2. However, the force measuring equipment may also be applied to a wheel balancer in a similar manner. Even if the following description relates to a load belt apparatus 26, it is clear that also a load roller may be used instead.

According to FIG. 4, the load belt apparatus 26 is supported by means of a casing or support frame 37 in a predetermined height level at the vertically extended support 20. The support frame 37 is rigidly connected to the support 20, wherein the sensor device 30 which includes a load cell 13 or which is designed as a load cell is arranged between the support frame 37 and the support 20. The load cell 13 includes a force feeling element 27 which is attached or rigidly connected on one side to the vertical support 20 and on the other side to the support frame 37. The forces acting between the tyre 10 and the load belt apparatus 26 influence the physical behavior of the force feeling element, while the distance between the axis S of the mounting device 18 and of the wheel/tyre assembly 14 and a plane containing the axes $B_{1/2}$ of a first and second belt roller 261 is kept constant during the force measurement. The wheel/tyre assembly 14 is loaded by the load belt apparatus 26 and rotates about its axis which is coaxial with the axis S of the mounting device 18. However, it is also possible to support the mounting device 18 or the load means 26, 126 in an elastic manner in the direction radial to the wheel/tyre assembly 14, so that the load force or first force Fz acting in radial direction is substantially kept constant during rotation of the wheel/tyre assembly 14 even if the wheel/tyre assembly 14 exhibits a radial runout.

The force measuring equipment can include one load cell 13 or one sensor device 30, as shown in FIG. 4, or more load cells or sensor devices, especially two load cells 13 or sensor devices 30 between the support frame 37 and the support 20, as shown in broken lines in FIG. 4. The load cell 13 or sensor device 30 may be arranged at another appropriate place within the arrangement which rigidly connects the shaft 19 of the mounting device 18 and the support frame 37 of the load belt apparatus 26, for instance between the shaft 19 and a shaft support 29 or the sliding carriage 36.

The feeling element 27 may be a deformable body provided with strain gauges whose electrical resistance is changed by a body deformation which can be bending, elongation, compression etc. The force feeling element 27 can be a magneto-elastic body whose deformation creates changes of electrical inductivity. Further, the 10 force feeling element 27 can be a piezo quartz crystal or a Hall element by means of which forces acting on it are transformed into an electrical voltage.

Thus, the load cell 13 or the sensor device 30 is able to provide an electrical signal which is directly proportional to the forces acting between the load belt apparatus 26 and the tyre 10.

The load cells or force sensors arranged to measure a first force (Fz) acting in a direction radial to the wheel/tyre assembly 14 comprise the first force sensors 13. The force sensors arranged to measure a second force (Fx) acting in a direction circumferential to the wheel/tyre assembly 14 comprise second force sensors 53. It is clear that the first and second force sensors 53 may be arranged either at the mounting device or the load means 26, 126 (at the support frame 37 of the load belt apparatus 26, for instance) in an arbitrary manner, because of the physical law of force and counter-force, as long as it is provided that the sensors respond to a force component acting in the corresponding direction and being transferred from the tyre contact patch to the force sensor. Therefore, the positions of the first and second force sensors 13 and 53 shown in FIG. 5 may be swapped. Moreover, it is also possible to arrange all first and second sensors 13, 53 at the rotary shaft of the mounting device 18 (or at the rotary axis of the load roller 126 or at the support frame 37 of the load belt apparatus, respectively), wherein the sensing directions of the first and second sensors 13, 53 being perpendicular to each other and perpendicular to the rotary axis S of the shaft 19 and the sensing direction of the second force sensors 53 being parallel to a tangent extending through the tyre contact patch.

The sensor device 30 or the load cell 13 can be connected to calibration means 15 designed to determine an absolute value of the force acting between the peripheral surface 28 of the wheel/tyre assembly 14 and the load belt apparatus 26. In the embodiment of the FIG. 4, the calibration means 15 are integrated into the electronic equipment of the control device 32, but the calibration means 15 can be incorporated in the sensor device 30 or the load cell 13. The calibration means 15 may perform a calibration procedure directly before a measuring run. In other words, a complete measuring run may include a calibration procedure at the beginning. To this, the second driving means driving the mounting device 18 or the load means 26, 126 for rotating the wheel/tyre assembly 14 is deactivated so that the load roller 26 does not rotate or the load belt 260 does not circulate. Then the load means is brought into contact with the peripheral surface of the tyre 10 by the first driving means to apply the predetermined load onto the wheel/tyre assembly 14. Since there is no rotation of the wheel/tyre assembly 14 at this time, no rolling resistance is produced and the force measured by the second force sensors 53 comprises only force components resulting from the radial load applied by the load means 26, 126 because of a positional error of the components (i.e. the force sensors, for example). Since the first force Fz typically is about 100 times or more stronger than the second force Fx, already small position errors or deflections of the components of the vehicle wheel service apparatus may result in significant measuring errors. The measured force values are then stored as reference values (zero values), and the calibration procedure is complete. In that condition, i.e. with the load applied by the load means 26, 126, the measuring run may then be started immediately by activating the second driving means 35 and accelerating the wheel/tyre assembly 14 to reach a constant measuring speed. Then a second force Fx is determined by subtracting the stored reference forces from the forces currently measured by the second force sensors 53. Thus, the determined second force Fx is not affected by positional errors of the components of the wheel service apparatus.

In another embodiment of the invention, the second force Fx may be determined from a driving torque applied to the load roller 126 or to the mounting device 18 by the second driving means 35. When the second driving means is arranged to drive the load roller 126, the second force Fx acting in circumferential direction of the tyre 10 may be determined by the equation $Fx=M_R/R$, wherein $M_R$ being the detected driving torque of the load roller 126, and R being the diameter of the load roller 126 (see FIG. 8). When, on the other hand, the second driving means 35 is arranged to drive the mounting device 18, the second force Fx acting on circumferential direction of the tyre 10 may be determined by the equation $Fx=M_W/r_L$, wherein $M_W$ being the detected driving torque of the mounting device 18 (i.e. the driving torque for the wheel 14), and $r_L$ being the rolling diameter of the tyre.

The support 20 of the load belt apparatus 26 and a sliding carriage 36 of the mounting device 18 are configured to move the load belt apparatus 26 and the mounting device 18 along a line (preferably a straight line) extending from the axis S of the mounting device 18 along the center plane C of the load belt apparatus 26. In the embodiment of the FIGS. 4 and 5, the mounting device 18 is driven by a linear drive 11, especially by an electro mechanic drive to apply the predetermined force onto the tread surface 28 of the wheel/tyre assembly 14.

The linear drive 11 includes self-locking mechanical means 31 which transmit the rotary movement of a motor 38 to the mounting device 18. The self-locking mechanism 31 includes a threaded spindle 39 which is rotary driven by the motor 38. A thread 40 of the spindle 39 engages into an internal thread 41 of the sliding carriage 36. During the rotation of the spindle 39, the mounting device 18 and the wheel/tyre assembly 14 are moved along a slotted hole in the support 22 to the load belt apparatus 26 or away from the load belt apparatus 26. For the force measurement, the tyre 10 is pressed against the load belt apparatus 26, as shown in FIG. 4, and the self-locking means 31 lock the axis S of the mounting device 18 and the plane containing the axes B of the first and second belt rollers 261 to a constant distance therebetween. Instead of the self-locking means 31 provided by the thread 40 of the spindle 39 and the internal thread 41 of the sliding carriage 36, other locking means, for instance bolts or the like can be used.

Figure 6:
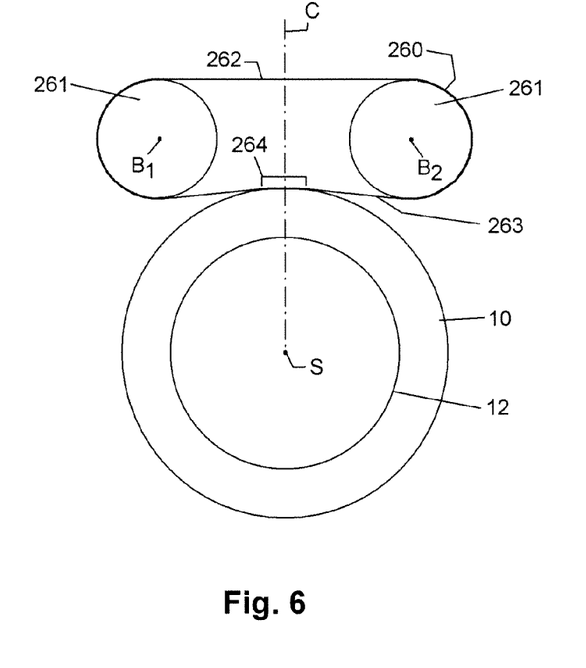
FIG. 6 schematically shows a load belt apparatus used in the vehicle wheel service apparatus according to the invention.

As shown in FIGS. 4 and 6, the load belt apparatus 26 comprises a casing or support frame 37 supporting at least a first and a second belt roller 261 around which a load belt 260 is tensioned. The belt rollers 261 are symmetrically arranged on both sides of a center plane C of the load belt apparatus 26, wherein the parallel axes $B_1$ and $B_2$ of the first and second belt rollers 261 extend within a plane perpendicular to the center plane C. The run of the load belt 260 facing the tyre 10 (also called the "contact run" 263 of the belt) is freely tensioned between the first and second belt rollers 261. On the opposite side of the belt rollers 261 a so called free run 262 of the belt 260 is freely tensioned. When the load belt apparatus 26 engages the tyre 10, the contact run 263 of the load belt 260 is deflected so that the contact run comprises a contact portion or area 264 between two free belt portions. The free belt portions extend straight-lined between the contact area 264 and the belt rollers 261, while the contact portion or area 264 is curved to a certain extent corresponding to the flattened contact surface of the tyre tread. The belt rollers 261 are supported at the support frame 37 with a very high spring stiffness to provide a high belt tension. If the belt tension is strong enough, deflection of the load belt 260 and curvature of the contact area 264 of the belt are small, i.e. the radius of curvature is large and usually is larger than the diameter of a conventional load roller. Furthermore, the curvature of the contact area 264 has the same direction as the curvature of the unloaded tyre so that the curvature of the contact surface of the tyre tread is not inverted. Thus, the shape of the contact area 264 of the load belt 260 is a good approximation of a flat road surface in comparison to cylindrical contact area of a conventional load roller 126.

Figure 7:
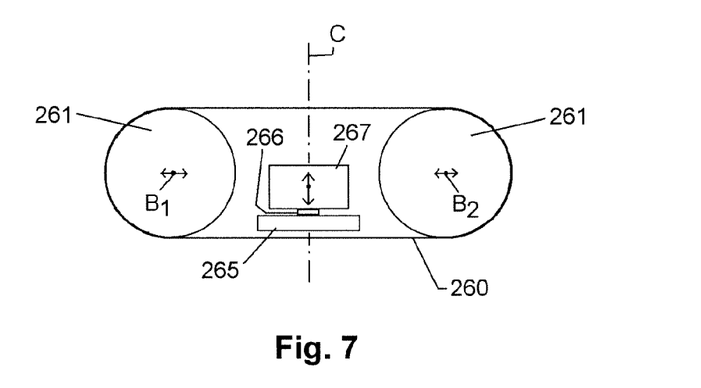
FIG. 7 schematically shows another embodiment of the load belt apparatus used in the vehicle wheel service apparatus according to the invention.

In a further development of the invention, shown in FIG. 7, the load belt apparatus 26 may comprise a belt supporting element 265, preferably a single belt supporting element 265 arranged between the belt rollers 261 and suitable to support the backside of the load belt 260 in the contact area 264. The belt support element 265 is carried on an element carrier 267. The element carrier 267 may be fixedly arranged in the support frame 27 of the load belt apparatus 26 so that the belt support element 265 is arranged in a certain predetermined distance to the backside of the contact run 264 of the belt 260 in an unloaded condition. When the belt 260 engages the tyre 10, the contact area 264 of the deflecting belt 260 contacts the supporting element 265 so that the contact area 264 is at least partially further flattened. In a further development, the element carrier 267 may be movable in a direction along the center plane C so that the distance to the unloaded belt 260 may be adjusted. In this manner, the control device 32 may be able to control the force or amount of engagement between the belt contact area 264 and the support element 265. To this purpose, at least one further load cell 266 may be arranged between the element carrier 267 and the support element 265 to measure the force applied by the support element 265 in radial direction of the wheel, i.e. perpendicular to the load belt along the center line C. And the support frame 37 can be provided force sensors for measuring forces acting on the support element in a circumferential direction of the wheel (i.e. in running direction of the load belt).

The belt support element 265 may be a flat plate having a slide surface facing the backside of the load belt 260, as shown in FIG. 7. In another embodiment of the invention, the belt support element 265 may be formed by a belt support roller (not shown). This is advantageous because the support roller avoids sliding friction between the backside of the load belt 260 and the support element 265, and thus suppresses generation of wear and disturbing friction forces affecting the measurement. The belt support roller provides for a further flattening of the contact area 264 by shaping the contact surface between the load belt 260 and the tyre 10 in a slightly waved shape in longitudinal direction of the belt 260 having a small area with a merely slightly inverted curvature in the middle between two portions with non-inverted curvature. In this manner, the combined effect of the belt tension and the supporting effect of the belt support roller results in a more flattened contact area 264 because the load belt does not completely follow the cylindrical surface of the support roller and the contact area 264 extends beyond the surface of the support roller on both sides in longitudinal direction (running direction) of the load belt. Thus, a good approximation of a flat road surface can be obtained without any sliding contact between the load belt 260 and the belt supporting element 265. In a further development of the invention, the belt support element 265 may comprise a plurality of (at least two) belt support rollers (not shown). In this case, the belt support rollers may have a constant diameter along their axial direction over the whole width of the load belt and may be arranged adjacent to each other in running direction of the load belt in a distance some-what larger than their diameter. In another embodiment, the plurality of belt rollers may have a plurality of relative short axial portions with larger diameter alternating with some-what longer axial portions with smaller diameter, so that adjacent belt support rollers may be arranged in a distance smaller than the larger diameter of the rollers, while the larger diameter portions of one roller are arranged opposite to the smaller diameter portions of an adjacent roller (i.e. the large diameter portions of adjacent rollers are arranged in a staggered manner). In this manner, a more uniform support of the load belt may be achieved resulting in a better approximation of a flat road surface.

According to a further embodiment of the invention, the evaluation device (which may be a separate device or may be integrated in the control device 32, for example) is further arranged to receive specific tyre data of the tyre 10. The specific tyre data may comprises an official fuel efficiency classification provided by the tyre manufacturer of the tyre 10, and an elapsed operation time of the tyre 10 which may be provided manually by the operator or automatically by the on-board computer of the vehicle to which the tyre was mounted. The specific tyre data also may be received from a plurality of sources, such as an RFID chip attached to the tyre or vehicle which may be written and read by an RFID communication device connected to the vehicle wheel service apparatus.

The evaluation device may be further arranged to calculate a current fuel efficiency classification of the tyre 10 based on the determined rolling resistance coefficient of the tyre 10 and the specific tyre data including the official fuel efficiency classification of the tyre 10. Furthermore, the evaluation device may be arranged to provide a comparison of the current fuel efficiency classification with the official fuel efficiency classification of the tyre 10, and optionally, may calculate an estimation of a remaining operation time of the tyre 10 (in terms of driving kilometers or months and years) up to the degradation to a lower fuel efficiency classification on the basis of the elapsed operating time (in the form of driven kilometers or age of the tyre) and the determined rolling resistance coefficient of the tyre 10.

According to a further embodiment of the invention, the evaluation device may be further arranged to receive specific vehicle data of the vehicle on which the tyre 10 is mounted. The specific vehicle data may comprise a vehicle type, a vehicle model, a vehicle weight, and a specific fuel consumption of the vehicle, for example. The evaluation device may be additionally arranged to provide an estimation of a future specific fuel consumption of the combination of the vehicle and the tyre 10. Furthermore, the evaluation device may be additionally arranged to provide a difference in specific fuel consumption of the combination of the vehicle and the tyre 10 between the current fuel efficiency classification and the official fuel efficiency classification of the tyre 10. These estimations may help a customer or owner of the vehicle to decide whether a new set of tyres should be mounted to the vehicle.

In a further development of the invention the vehicle wheel service apparatus further comprises printing means for printing at least one of the determined rolling resistance coefficient and the evaluation results of the tyre 10. It is also feasible to store the evaluation results on an RFID chip or another data carrier accompanying the vehicle or the tyre 10. Furthermore, the individual evaluation results for the respective tyre may be stored in a data base of the automotive shop, for example, for further use such as comparison with later test results of the same tyre.

In order to achieve more accurate rolling resistance coefficient RRC and to assure determination of a correct fuel efficiency classification of the tested tyre 10, the vehicle wheel service apparatus may further comprise temperature detecting means arranged to detect the temperature of the tyre 10. The temperature detecting means preferably comprises an infrared thermometer (pyrometer) directed onto the tread surface of the tyre 10 to detect the temperature of the tread portion of the tyre 10. The determined rolling resistance coefficient RRC may then be corrected on the basis of the detected tyre temperature.

An angular measuring device 21 may be connected to the shaft 19 of the mounting device 18 to determine the angular position of the wheel/tyre assembly during its rotation, especially during the measurement of the forces.

It has to be noticed that the load belt apparatus of the invention may also be arranged in a horizontal manner at the base frame of the automotive shop service machine (tyre changer) while the wheel mounting device 18 may be arranged with a horizontal axis S. The mounting device 18 and/or the load belt apparatus 26 may then be moved towards or apart from each other in a vertical direction, while the load belt apparatus 26 and/or the mounting device 18 may be moved in a horizontal direction to adjust the relative position of the load belt apparatus to different tyre type having different widths, for example. Such an arrangement is in particular suitable for other automotive shop service machines, such as wheel balancers for example, which can be equipped with the load belt apparatus of the invention as well.

In a further development of the invention, the apparatus may comprise a vision system 16, 43 (or an optical measuring system) such as a video camera system or a laser optic system for providing additional data about the tyre/wheel assembly, as shown in FIG. 4. For example, the vision system may scan certain portions of the tyre/wheel assembly in a vision area 42 or laser scanning area 42 and automatically determine the specific types of the tyre and the rim by evaluating optically scanned data or geometrical dimensions of the tyre and the rim. Furthermore, the data provided by the vision system may be compared with data of tyre types and rim types stored in a data base to gain additional data from the data base. To this, the vision system may detect and recognize markings on the tyre or the rim, for example. Moreover, deformation of the tyre when applying a load by the load means may be detected and evaluated in order to check or correct the measuring results determined by means of the other sensors mentioned above.

LIST OF REFERENCES 10 tyre
11 linear drive
12 wheel rim
13 first force sensor, load cell
14 wheel/tyre assembly (vehicle wheel)
15 calibration means
16 optical scanning device or camera
17 matching device
18 mounting device
19 shaft of the mounting device
20 support (pillar) of the roller
21 angular measuring device
22 support of the mounting device
23 mounting/demounting tool
24 bead releasing tools
25 tool carrier
26 load belt apparatus
261 belt roller
262 free run of load belt
263 contact run of load belt
264 contact area of load belt
265 belt support element
266 load cell
267 element carrier
126 load roller
27 force feeling element
28 peripheral surface (thread surface) of the wheel/tyre assembly
29 shaft support
30 sensor device 31 self-locking mechanical means
32 control device
33 slotted hole
34 roller shaft
35 rotary drive
36 sliding carriage
37 support frame, casing of load belt apparatus
38 motor (electric motor)
39 threaded spindle
40 external thread
41 internal thread
42 scanning area
43 optical scanning device or camera
53 second force sensor, load cell

The invention claimed is:

1. A vehicle wheel service apparatus, in particular a wheel balancer or a tyre changer, comprising:
a mounting device arranged to rotatably receive a wheel/tyre assembly comprising a tyre and a wheel rim,
a load means for applying a predetermined load onto a peripheral surface of the wheel/tyre assembly,
first driving means arranged to move the mounting device and the load means relative to each other so that the peripheral surface of the wheel/tyre assembly (14) comes into contact with the load means,
a control device arranged to control the movement of the mounting device and the load means relative to each other, and arranged to control the predetermined load applied by the load means,
second driving means arranged to drive the mounting device and/or the load means for rotating the wheel/tyre assembly at least while it is in contact with the load means,
a sensor device arranged to determine forces acting between the peripheral surface of the wheel/tyre assembly and the load means, wherein the forces comprise at least a first force (Fz) acting in a radial direction of the wheel/tyre assembly and a second force (Fx) acting in a circumferential direction of the wheel/tyre assembly, and
an evaluation device arranged to determine a rolling resistance coefficient of the tyre on the basis of the first and second forces (Fz, Fx) determined by the sensor device.

2. The apparatus according to claim 1, further comprising at least one first force sensor, preferably a load cell, arranged to detect the first force (Fz) at a support element of the mounting device or at a support element of the load means.

3. The apparatus according to claim 1, wherein the load means comprises a load belt apparatus.

4. The apparatus according to claim 1, wherein the load means comprises a load roller.

5. The apparatus according to claim 1, further comprising at least one second force sensor, preferably a load cell, arranged to detect the second force (Fx) at a support element of the mounting device or at a support element of the load means.

6. The apparatus according to claim 1, further comprising a torque detecting means detecting a driving torque of the second driving means; and
wherein the sensor device is further arranged to determine the second force (Fx) on the basis of the detected driving torque.

7. The apparatus according to claim 1, further comprising a power detecting means detecting a driving power of the second driving means; and
wherein the sensor device is further arranged to determine the second force (Fx) on the basis of the detected driving power.

8. The apparatus according to claim 1, further comprising a rotary deceleration detecting means detecting a rotary deceleration of the idling rotary system including the tyre/wheel assembly and the load means; and
the sensor device is further arranged to determine the second force on the basis of the detected rotary deceleration and a moment of inertia of the idling rotary system.

9. The apparatus according to claim 1, wherein the control device is further arranged to perform a calibrating procedure prior to a measuring run.

10. The apparatus according to claim 9, wherein the calibrating procedure comprises deactivating the second driving means, applying the predetermined load onto the peripheral surface of the wheel/tyre assembly by the load means and setting a force measured by the second force sensor as a reference value, and
the measuring run comprises activating the second driving means to rotate the wheel/tyre assembly with a constant speed, and determining the second force (Fx) by subtracting the reference value determined during the calibrating procedure from a force currently measured by the second force sensor.

11. The apparatus according to claim 1, wherein the rolling resistance coefficient is determined for different rotary speeds of the wheel/tyre assembly.

12. The apparatus according to claim 1, wherein the evaluation device is further arranged to receive specific tyre data of the tyre, wherein the specific tyre data comprises at least one of an official fuel efficiency classification provided by the tyre manufacturer of the tyre, and an elapsed operation time of the tyre; and
wherein the evaluation device is further arranged to provide at least one of the following evaluation results, based on the specific tyre data and the determined rolling resistance coefficient of the tyre:
a current fuel efficiency classification of the tyre,
a comparison of the current fuel efficiency classification with the official fuel efficiency classification of the tyre, and
an estimation of a remaining operation time of the tyre up to the degradation to a lower fuel efficiency classification.

13. The apparatus according to claim 12, wherein the evaluation device is further arranged to receive specific vehicle data of the vehicle on which the tyre is mounted, wherein the specific vehicle data comprises at least one of a vehicle type, a vehicle model, a vehicle weight, and a specific fuel consumption of the vehicle; and
wherein the evaluation device is further arranged to provide at least one of the following evaluation results, based on the specific vehicle data, the specific tyre data and the determined rolling resistance coefficient of the tyre:
an estimation of a future specific fuel consumption of the combination of the vehicle and the tyre, and
a difference in specific fuel consumption of the combination of the vehicle and the tyre between the current fuel efficiency classification and the official fuel efficiency classification of the tyre.

14. The apparatus according to claim 1,
wherein the apparatus further comprises printing means for printing at least one of the determined rolling resistance coefficient and the evaluation results of the tyre.
15. The apparatus according to claim 1,
wherein the apparatus further comprises means for determining at least one parameter of a group comprising an ambient temperature, a temperature of the tyre, a vehicle type, the predetermined load applied to the peripheral surface of the tyre by the load means, a rolling radius ($r_L$) of the tyre, a tyre inflation pressure, a diameter of the load roller, a rotary speed of the tyre/wheel assembly during measurement, a texture of the contact surface of the load means, an aerodynamic drag resistance of the tyre/wheel assembly and/or the load means; and
wherein the evaluation device is further arranged to correct the determined rolling resistance coefficient on the basis of the determined at least one parameter.

* * * * *